(12) United States Patent
Rebholz et al.

(10) Patent No.: US 11,097,360 B2
(45) Date of Patent: Aug. 24, 2021

(54) ROTARY TOOL HAVING EXCHANGEABLE CUTTING INSERTS AND TOOL MAIN-BODY SET FOR A ROTARY TOOL

(71) Applicant: GUEHRING KG, Albstadt (DE)

(72) Inventors: Felix Rebholz, Stetten-Frohnstetten (DE); Ingo Von Puttkamer, Messstetten (DE)

(73) Assignee: Guehring KG, Albstadt (DE)

( * ) Notice: Subject to any disclaimer, the term of this patent is extended or adjusted under 35 U.S.C. 154(b) by 13 days.

(21) Appl. No.: 16/204,202

(22) Filed: Nov. 29, 2018

(65) Prior Publication Data
US 2019/0168315 A1    Jun. 6, 2019

Related U.S. Application Data

(63) Continuation of application No. PCT/EP2017/063538, filed on Jun. 2, 2017.

(30) Foreign Application Priority Data

Jun. 2, 2016  (DE) .......................... 102016110193.1

(51) Int. Cl.
*B23B 51/08*  (2006.01)

(52) U.S. Cl.
CPC .......... *B23B 51/08* (2013.01); *B23B 2251/02* (2013.01)

(58) Field of Classification Search
CPC ................ B23B 51/08; B23B 2251/02; B23B 2251/505; B23B 2251/50; B23B 2251/54;
(Continued)

(56) References Cited

U.S. PATENT DOCUMENTS

| 1,478,451 A | * | 12/1923 | Mullin | .................... B23B 51/04 |
| | | | | 408/171 |
| 2,050,413 A | | 8/1936 | Baumbach | |
| 5,599,145 A | | 2/1997 | Reinauer et al. | |
| 5,904,455 A | * | 5/1999 | Krenzer | .................. B23B 51/00 |
| | | | | 408/144 |

(Continued)

FOREIGN PATENT DOCUMENTS

| CN | 202591689 | 12/2012 |
| CN | 203030997 | 7/2013 |

(Continued)

OTHER PUBLICATIONS

Description DE2632663 (translation) obtained at https://worldwide.espacenet.com/ (last visited Apr. 29, 2020).*

(Continued)

*Primary Examiner* — Ryan Rufo
(74) *Attorney, Agent, or Firm* — Burr & Brown, PLLC

(57) ABSTRACT

A rotary tool, comprising: a tool main body comprising a clamping section and a tool head; an exchangeable first cutting insert having at least one first cutting region having a first cutting edge, wherein the first cutting insert can be inserted into an insert groove of the tool main body from the front side of the tool head and can be fastened therein in a rotationally fixed manner; and an exchangeable second cutting insert fastened to the tool head and offset toward the clamping section in the axial direction of the rotary tool relative to the first cutting insert and which has an insert main body and at least one second cutting region having at least one second cutting edge. A fastening means for the second cutting insert is arranged in the insert groove of the first cutting insert. Also, a cutting insert set and a tool main-body set.

8 Claims, 7 Drawing Sheets

(58) Field of Classification Search
CPC ........ B23B 2200/3618; B23B 2205/00; B23B 2205/04; B23B 2229/08; B23C 2210/02; B23C 2210/287; B23D 77/12; B23D 2277/32; B23D 2277/68; B23D 2277/74
See application file for complete search history.

(56) References Cited

U.S. PATENT DOCUMENTS

| | | | |
|---|---|---|---|
| 7,445,411 | B2 | 11/2008 | Tchorny et al. |
| 2006/0140732 | A1 | 6/2006 | Hecht et al. |
| 2006/0222469 | A1* | 10/2006 | Nuzzi ................. B23B 51/06 408/224 |
| 2006/0222470 | A1 | 10/2006 | Tchorny et al. |
| 2014/0255116 | A1 | 9/2014 | Myers et al. |
| 2016/0311037 | A1* | 10/2016 | Studer ................. B23B 51/02 |

FOREIGN PATENT DOCUMENTS

| | | | | |
|---|---|---|---|---|
| CN | 104308233 | | 1/2015 | |
| DE | 393966 | C * | 4/1924 | ............. B23B 51/04 |
| DE | 803143 | C * | 3/1951 | ............... B23C 5/10 |
| DE | 2632663 | A1 * | 1/1978 | ............. B23P 13/02 |
| DE | 2750705 | | 5/1979 | |
| DE | 10 2009 044 995 | | 4/2011 | |
| DE | 10 2011 051 374 | | 12/2012 | |
| DE | 102014102952 | | 9/2014 | |
| EP | 0674560 | | 10/1995 | |
| GB | 937767 | A * | 9/1963 | ............. B23D 77/02 |
| GB | 2092033 | A * | 8/1982 | ............. B23B 51/08 |
| WO | 94/12305 | | 6/1994 | |
| WO | 2005/037473 | | 4/2005 | |
| WO | 2006/103650 | | 10/2006 | |

OTHER PUBLICATIONS

International Search Report and Written Opinion of the International Searching Authority from a corresponding international patent application (PCT/EP2017/063538) dated Aug. 24, 2017, 12 pages.
DPMA Register, DE File No. 10 2016 110 193.1, 2 pages.

* cited by examiner

ROTARY TOOL HAVING EXCHANGEABLE CUTTING INSERTS AND TOOL MAIN-BODY SET FOR A ROTARY TOOL

The invention relates to a rotary tool for machining of workpieces comprising a tool main body comprising a clamping section and a tool head as well as an exchangeable first cutting insert according to the teaching of claim 1.

The invention further relates to a cutting insert as well as a tool base body set for a rotary tool according to the invention.

PRIOR ART

Known from the prior art are a plurality of rotary tools which comprise an insert base body with a clamping section and a tool head. The clamping section can be a clamping shaft or a specially shaped axial end region of the rotary tool which is configured for receiving in a special clamping device such as an HSK clamping device. Such rotary tools can be drilling tools, reamers, milling or polishing tools. Usually generic rotary tools have at least one cutting edge in the tool head by means of which material is removed from a workpiece in a machining operation. In particular, in the case of high-performance rotary tools, for example HPC (high performance cutting) or HSC (high-speed cutting) rotary tools, one or more coolant channels are provided in the rotary tool in order to introduce a cooling and/or lubricating fluid into the region of the tool head in order to cool the tool head and the embraced cutting edge and remove material from the cutting region.

During the machining of aluminium and soft metal materials which have a higher silicon content, a high wear of a rotary tool is obtained as a result of the toughness of the workpiece to be machined. As a result, in particular surfaces in the tool head of a rotary tool are mechanically and thermally stressed with the result that after fairly long usage of the rotary tool, these become thinner and wear. As a result, there is the risk that the mechanical stability of the rotary tool, the lubricity and the lifetime will be restricted. As a result of this, rotary tools are already known in the prior art in which a cutting insert can be exchanged in order to be able to exchange not the entire tool but only a cutting insert in cases of wear.

Thus, DE 10 2009 044 995 A1 discloses a rotary tool with an exchangeable cutting insert which is arranged at the front of the tool head. The cutting insert in inserted into a front insert groove in the tool head and fixed. The cutting insert is centred with the aid of a feed tube which engages partially in the cutting insert and partially in a central cooling channel of the tool head. Further generic rotary tools are disclosed in DE 10 20 14 102 952 A1 and EP 0 674 560 B1.

After a machining, the surfaces of an introduced hole or recess are usually reworked by means of a reaming tool to form a high surface quality. In the prior art, combined drilling and reaming tools are known for this which can produce a bore and rework the recess surface in a frictional manner. The cutting bits are designed as hard metal inserts and can be exchanged, the reaming blades are connected in one piece to the tool shaft. When the reaming blades wear, the entire tool has to be exchanged.

DE 10 2011 051 374 A1 discloses a drilling tool having an exchangeable first cutting insert (32) which is arranged on the tool head and fixed on the tool head by means of a clamping screw running perpendicular to the tool axis. In this case, the clamping screw runs through a through hole through the cutting insert. At least one second cutting insert is arranged offset in the longitudinal direction in the direction of the clamping section. This cutting insert is an indexable cutting insert which is screwed onto the edge of the coil of the drilling tool. In this case however, no second cutting insert in the form of a reaming cutting insert is disclosed which is fixed in a through hole running transversely to the longitudinal axis.

WO2005/0037473 A1 also discloses a drilling tool with an exchangeable first cutting insert on the tool head tip and a second cutting insert arranged in the longitudinal direction thereto. The second cutting insert is configured for deburring or chamfering and runs through a through hole running transversely to the longitudinal direction of the drilling tool. In the direction of the clamping section the cutting insert is mounted via a torsion spring so that a finely adjustable and minimal horizontal displacement of the second cutting insert in the through hole is made possible. As a result, unevennesses in the bore or in the production of the bore and influences due to accumulating chippings are compensated by the drilling tool. From the side of the tool head tip the second cutting insert is clamped via a plate and a screw running in the longitudinal direction of the tool. In this case, the clamping screw does not act through the second cutting insert, with the result that a radial displacement of the second cutting insert is made possible with inadequate clamping which is also expressly desired in this document. A precise radial alignment of the second cutting insert is thereby made difficult or cannot be achieved.

CN 203 030 997 U also discloses a drilling tool with a first and a second cutting insert comparable to WO 2005/0037473 A1. The second cutting insert is also mounted in an opening arranged transversely to the longitudinal axis of the tool. Unlike WO 2005/0037473 A1, the second cutting insert runs over the entire length of the opening so that reaming blades are arranged on both outlet sides. The second cutting insert is fixed by means of two pins and via a plurality of fastening means. In this case, the fastening means run in the transverse and longitudinal direction of the drilling tools. The second cutting insert comprises two pins and is inserted laterally into the tool head. In this case, the opening for the second cutting insert is not a through hole but an slot open on one side. The fixing of this second cutting insert is accomplished neither through the through-hole nor through an axially centrally arranged fastening means. An axial centring of the second cutting insert is thereby not ensured and the cutting insert can migrate radially.

CN 202 591 689 U discloses a drilling or cutting tool which is used especially for the manufacture of components of pressure vessels. This has a second cutting insert in the form of a reaming blade, wherein this is fixed in a through hole in the tool head. The reaming blade is fixed in a clamping manner via a bolt arranged transversely to the longitudinal axis of the tool. The fastening means of the second cutting insert does not run radially through the second cutting insert and does not run in the axial direction of the tool. Comparably to WO 2005/0037473 A1, the second cutting insert can accordingly be displaced horizontally inside the through hole, with the result that the axial positioning is inaccurate.

It is the object of the invention to propose a rotary tool with several clamping regions which ensures a material-saving and cost-saving manufacture and a long life of the rotary tool.

This object is achieved by a rotary tool according to the independent claims. Advantageous further developments of the invention are the subject matter of the subclaims.

The object is further solved by a cutting insert set and a tool main-body set according to the equivalent claims.

DISCLOSURE OF THE INVENTION

The invention relates to a rotary tool for a machining of workpieces comprising a tool main body comprising a clamping section and a tool head, as well as an exchangeable first cutting insert having at least one first cutting region having a first cutting edge, wherein the first cutting insert can be inserted from the front side of the tool head into an insert groove of the tool main body and can be fastened therein in a rotationally fixed manner.

According to the invention, an exchangeable second cutting insert, in particular a reaming blade insert, is fastened on the tool head in an offset position with respect to the second cutting insert in the axial direction of the rotary tool in the direction of the clamping section. The second cutting insert comprises an insert main body and at least one second cutting region having at least one second cutting edge.

It is proposed that the second cutting insert can be fixed by means of a central position with respect to the tool head cross-section from the front side of the tool head, wherein a fastening means, in particular a screw, preferably a countersunk screw for fastening the second cutting insert is arranged in the insert groove of the first cutting insert and is accessible from the front side. Thus, the second cutting insert can be fixed by a bolt or a screw which is arranged on the axis of rotation of the rotary tool. The fastening means is located completely inside the tool head cross-section and cannot be damaged or detached by abrasion on the surface of the tool head. In addition in the position on the axis of rotation of the rotary tool, it experiences the lowest possible forces during rotation of the rotary tool. It is possible to exchange the second cutting insert after removing the first cutting insert.

Furthermore according to the invention, the fastening means is configured to be longer than the diameter D of the insert main body, wherein the fastening means has a thread for screwing to the tool main body in at least one region outside the insert main body in the installed state in the insert main body and preferably has a smooth surface in the regions inside the main body so that the insert main body is mounted freely twistably towards the fastening means. This is particularly advantageous for centring of the second cutting insert on the axis of rotation since the insert main body can move freely with respect to the fastening means before making the fastening. As a result, the second cutting insert can be pressed against the tool head without tilting or clamping. A rotationally fixed fixing takes place between the fastening means and the tool head. A rotationally fixed fixing between second cutting insert and tool head is accomplished through a through-hole or a groove into which the second cutting insert is pushed or inserted.

In other words, the invention discloses a rotary tool having two cutting inserts which are arranged in two offset positions in the longitudinal direction of the rotary tool and are mounted detachably or exchangeably on the tool head. In this case, the first and the second cutting insert are arranged on the same side of the rotary tool or also at offset positions in the circumferential direction. Preferably the first cutting insert is arranged at the front on the tool main body. Each cutting insert can have one, two, three, four or more cutting regions. The second cutting insert can be configured identically to the first cutting insert as a widening blade or as a reaming blade in the form of a reaming blade insert. Differences here lie particularly in the configuration of the cutting regions and the cutting edges. The exchangeable first cutting insert can be accommodated in an insert groove of the main body and fixed via a screw or a bolt on the tool head. Likewise the first cutting insert can have a pin on the underside which engages in an additional recess in the insert groove and additionally fixes the first cutting insert in a rotationally fixed manner and axially aligned on the tool head. When fastening using a screw or a bolt, these can engage radially in the tool head. The same applies to the second exchangeable cutting insert. The second cutting insert can also be screwed on and/or inserted. The fastening, preferably by means of a screw, of the second cutting insert is only accessible after removing the first cutting insert. After this, a fastening means of the second cutting insert arranged in a recessed manner in the insert groove of the first cutting insert can be released from the tool main body and released from the tool main body. Usually the second cutting insert is subject to less wear than the first cutting insert and can be exchanged with this or even after a fairly long lifetime. The tool main body is not further weakened by the type of fastening according to the invention and no expensive additional fastening means need be introduced. The fastening of the first cutting insert can be accomplished by means of a radial fastening means, for example, an insert screw which is screwed into both flanks of the insert groove.

When the second cutting insert is configured as a reaming blade or reaming blade insert, the second cutting insert is advantageously arranged particularly close to the first cutting insert so that a reworking of the inner surface of a bore can be carried out over a largest possible region of the bore. This accordingly requires that the second cutting insert is arranged as close as possible to the tip of the tool head and recuts to some extent. As a result, an improved inner surface of the bore and a more accurate drilling almost as far as the drilling base can be produced. The position of the second cutting insert is determined inter alia according to the course of the spirals, i.e. the spiral angle in the tool head so that the second cutting insert is preferably arranged on the spiral and not in the groove.

If all the cutting inserts are mounted exchangeably, the tool main body can have a long lifetime and can be used flexibly for different cutting inserts since the wearing parts can be exchanged and renewed at any time.

Preferably the insert main body can be inserted exchangeably into a radial through hole of the tool head. In such a through-hole the radial position of the second cutting region can be adjusted and fixed variably. This makes it possible to have a rotary tool with two cutting inserts aligned variably with respect to one another, wherein one bore and at the same time one groove or similar can be prepared. For example, an undercut and a securing groove can be performed with the same rotary tool without needing a change of tool. The through-hole can be formed at any angle to the insert groove, with the result that the at least one cutting edge can be arranged at any angle to the first cutting edge in relation to the circumference of the tool head.

In a further preferred embodiment of the preceding embodiment, the length L of the insert main body can be less than or equal to the diameter of the tool head and the cutting region can projects beyond the radius of the first cutting region by a radial distance $\Delta d$. In an embodiment as a reaming blade, the second cutting insert has only a small radial projection of the at least one second cutting edge with respect to the at least one first cutting edge. Thus, the inner surface of a bore or similar can be reworked without the diameter of the bore undergoing a substantial change. The surface condition and the coefficient of friction of the surface can thereby be improved. If the insert main body has a smaller length than the diameter of the tool head and the geometry of the cutting region differs from that of the insert main body, a region for removing the chippings produced by the second cutting insert can be formed.

In a further developed embodiment, the insert main body can be configured to be cylindrical and have a circular, partially circular, rectangular or elliptical cross-section, wherein preferably the cross-section and/or the cross-sectional shape is variable over the length L of the insert main body. The configuration of a variable cross-section also enables the removal of chippings or coolant or lubricant in the region of the second cutting insert. Preferably the insert main body is configured to be tapering and/or flattened towards the edge regions. A non-circular cross-section enables a positive radial alignment of the insert main body during insertion into the tool main body.

In a preferred embodiment, the second cutting insert can be configured to be point-symmetrical in relation to a point on a cross-sectional surface at half the length of the second cutting insert. A point-symmetrical second cutting insert has at its axial end opposite second cutting regions each having at least one second cutting edge. Likewise, the insert main body is configured to be symmetrical with respect to the centre point of the insert main body. The point symmetry makes it possible for a component to be machined with the second cutting insert on at least two opposite sides of a rotary tool which increases the lifetime and reduces the mechanical loading during use. The insert main body can have a through hole at the symmetry point for application of a fastening means such as a screw or a bolt. This makes it possible to fix the second cutting insert at the symmetry point.

In a preferred embodiment the insert main body and the second cutting region can be formed from separate components, wherein the second cutting region with the second cutting edge is soldered, welded or screwed onto the insert main body. If the cutting region is screwed on, this enables only the cutting region to be exchanged and not the complete second cutting insert. Likewise the cutting insert can be clamped in a groove. If the insert cutting body and the cutting region are formed from separate components, cutting regions and insert main bodies of different geometries can be fabricated and combined by simple methods of manufacture.

In a preferred embodiment, the insert main body has a radial through-hole transverse to the direction of insertion and preferably a conical recess in which the head of the fastening means can be recessed at least partially, with the result that the second cutting insert is fastened in a centred manner on the axis of rotation in the tool head. The recessed head of the fastening means enables the second cutting insert to be mounted in a non-positive and positive fixed manner in the tool main body. If the second cutting insert forms a reaming blade, the surface of the bore can be reworked almost over the complete depth as far as the drilling base. As a result of the centring of the second cutting insert on the axis of rotation, in a point-symmetric design of the second cutting insert relative to the centre point of the cutting insert, every other cutting edge can be placed at the same distance from the surface of the tool head so that an exact centred machining with two second cutting edges of the second cutting insert is made possible.

In a preferred embodiment, the insert groove can have a blind hole in the direction of the clamping section which has at least two sections with different diameter, wherein at least one section, preferably a section arranged in the direction of the tool shaft has a thread. The section of the blind hole arranged closer to the front side of the tool head preferably has a larger diameter than the second section which is arranged further from the front side and in the direction of the tool shaft. As a result, a fastening means for fastening the second cutting insert can comprise a head with a larger diameter than the shaft of the fastening means and be screwed into the blind hole. If the second section has the thread, the fastening means, preferably a threaded screw, presses the second cutting insert with the tool main body non-positively. This makes it possible to mount or dismount an exchangeable first cutting insert and an exchangeable second cutting insert in the tool head as a result of the following steps:

inserting the second cutting insert into a radial through hole or a groove in the tool head;

inserting a fastening means in the longitudinal direction of the rotary tool through a through-hole of the insert main body of the second cutting insert;

screwing the fastening means into a blind hole arranged on the axis of rotation of the tool head with a thread for fixing and centring the second cutting insert; in this case, centring by recessing the head of the fastening means in a conical recess in the through-hole of the insert main body;

inserting the first cutting insert into an insert groove from the front side of the tool head;

fastening the first cutting insert by radial screwing of a screw or radial insertion of a bolt into the tool head and through the cutting insert;

repeating the steps in the reverse order for dismounting the first and the second cutting insert.

In the section of the blind hole which is arranged closer to the front side, a pin or similar which is provided on the first cutting insert can be inserted further for centring the first cutting insert if the fastening element sits lower. Thus, the blind hole can also serve to prevent any rotation of the first cutting insert relative to the tool head. Such a pin in the installed state of the two cutting inserts can be in contact with the fastening means of the first cutting insert or have a spacing therefrom.

The radial alignment from the first cutting insert and second cutting insert can be angled. Thus, coolant channels which extend in the tool main body can be guided unchanged and the radial recess in the tool main body which receives the second cutting insert can be aligned in such a manner that an equal distance from the second cutting insert to the coolant channels is given.

The invention further relates to a cutting insert set for a rotary tool according to the invention. It is proposed that the cutting insert set comprises at least one first cutting insert and/or a second cutting insert for replacement exchange in a tool main body of the rotary tool. This makes it possible to mount different or identical first and/or second cutting inserts consecutively on only one tool head with the result that the tool head with the clamping section can be used for longer, which saves material, acquisition and manufacturing costs and the lifetime is increased.

In a preferred embodiment of the cutting insert set, a fastening means for fastening the second cutting insert can be comprised. The fastening means can be a threaded screw, preferably with countersunk head, further preferably with a torx or socket screw head. Thus, all the exchangeable individual parts can be exchanged or renewed subsequently.

The invention further relates to a tool main body set for a rotary tool according to the invention. It is proposed that the tool main body set comprises at least one clamping section and a tool head with an insert groove on the front side of the tool head. This makes it possible to exchange the tool main body when individual first and/or second cutting inserts are to be re-used and the tool main body must be exchanged as a result of wear or similar.

In a preferred embodiment of the tool main body set, the tool head can have a radial through hole arranged in an offset position with respect to the insert groove in the axial direction of the rotary tool in the direction of the clamping section. Thus, a first and a second cutting insert can be anchored in the tool head.

In a further preferred embodiment of the tool main body set in the insert groove a blind hole can be arranged on the axis of rotation, which has at least two different diameters and intersects the through-hole. Thus, the second cutting insert can be attached with a small distance in an offset position in the direction of the clamping section in the longitudinal direction of the rotary tool. As a result, a surface of a bore or similar can be reworked almost as far as the drilling base with the second cutting insert.

DRAWINGS

Further advantages are obtained from the present drawings and descriptions of the drawings. Exemplary embodiments of the invention are shown in the drawings. The drawings, the description and the claims contain numerous features in combination. The person skilled in the art will expediently also examine the features individually and combine them into appropriate further combinations.

In the figures.

In the figures the same or same type of components are numbered with the same reference numbers.

Figure 1:
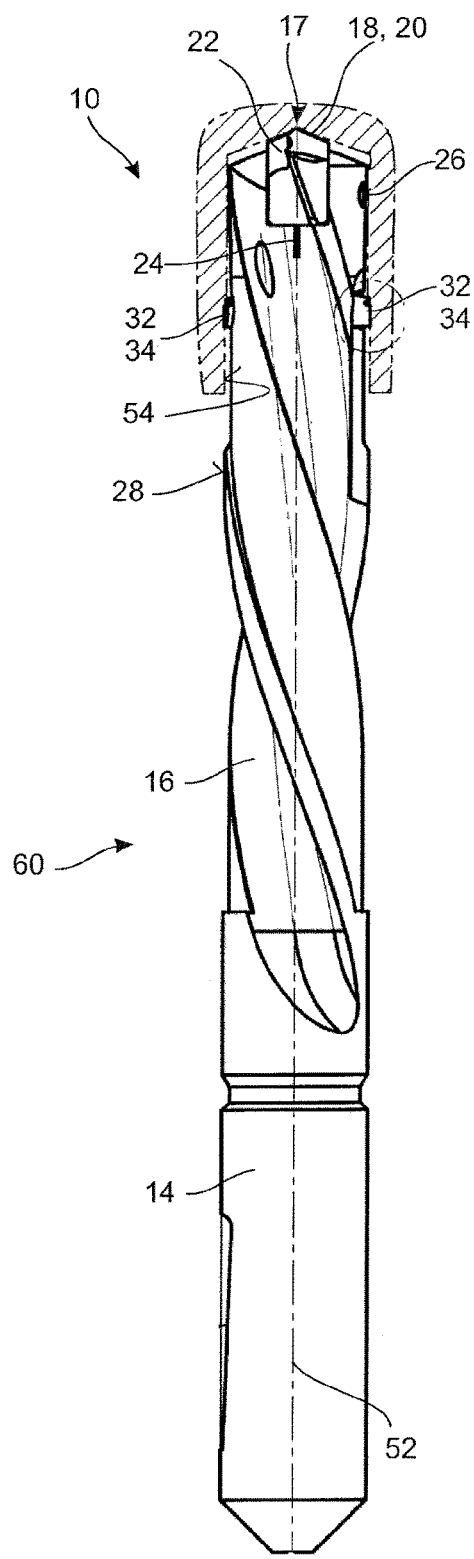
FIG. 1 shows an outer view of one embodiment of a rotary tool according to the invention.

FIG. 1 shows an outer view of one embodiment of a rotary tool 10 according to the invention when used in a bore. The rotary tool 10 has a tool main body 60 with a clamping section 14 and a tool head 16. The tool head 16 is located in the diagram partially inside a bore with an inner surface 54. The tool head 16 has an insert groove 58 with a strain-relief slot 24 on the front side, wherein a first cutting insert 22 is introduced into the insert groove 58. The first cutting insert 22 is fastened by a screw 26 to the tool head 16, wherein the screw 26 runs radially through the tool head 16 and through the first cutting insert 22. In an axially offset position relating to the front side 17 in the direction of the clamping section 14 a second cutting insert 30 is attached to the tool head 16. A second cutting region 32 with a second cutting edge 34 of the second cutting insert 30 projects radially on the depicted left and right side of the tool head 16. The diagram shows a view from a parallel-offset plane with respect to the cross-section of the insert groove 58. As a result, the insert groove 58 with the first cutting insert 22 is visible in side view. It is clear that the second cutting insert 30 is not arranged in a rectangular position with respect to the first cutting insert 22 in the tool head 16 since the second cutting region 32 shown on the left is partially concealed by the tool head 16. The radial alignment of the second cutting insert 30 is determined according to the course of the spiral of the coolant channels, i.e. a spiral angle of the coolant channels in the tool head 16 and the axial distance from the front side 17 of the tool head 16 so that the second cutting insert 30 preferably has the same lateral distances from the coolant course.

Figure 2:
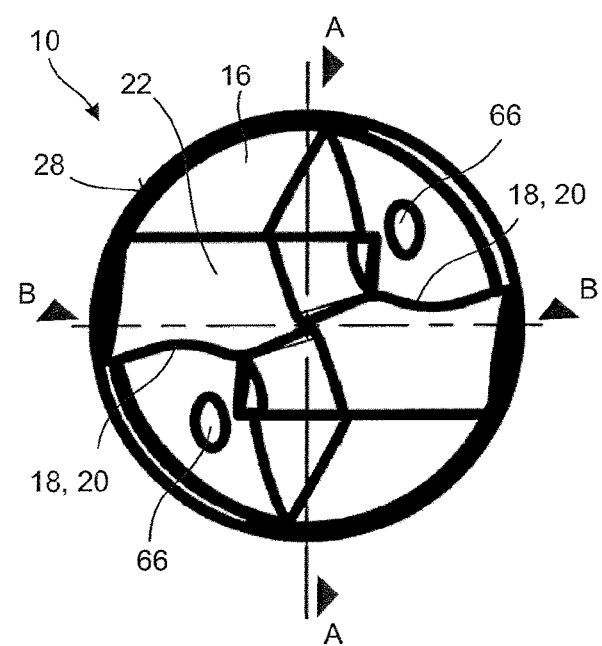
FIG. 2 shows a plan view of the front region of the tool head of one embodiment of a rotary tool according to the invention.
Figure 6:
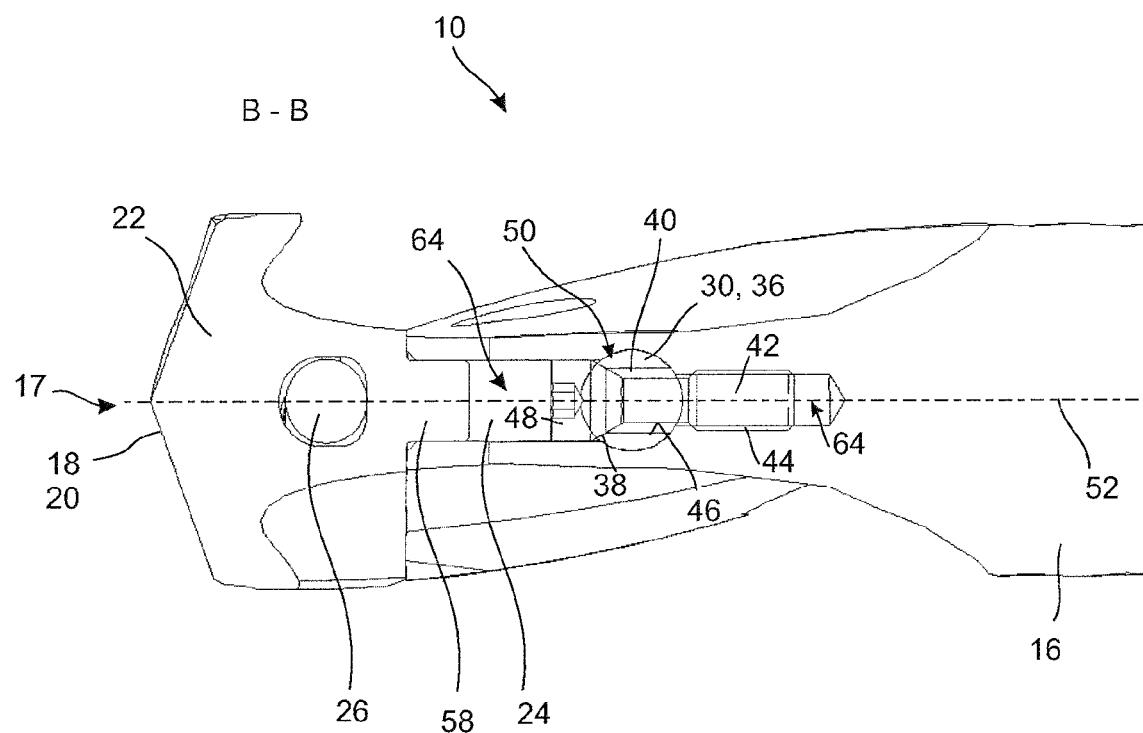
FIG. 6 shows a longitudinal section through a section of a tool head according to FIG. 4.
Figure 7:
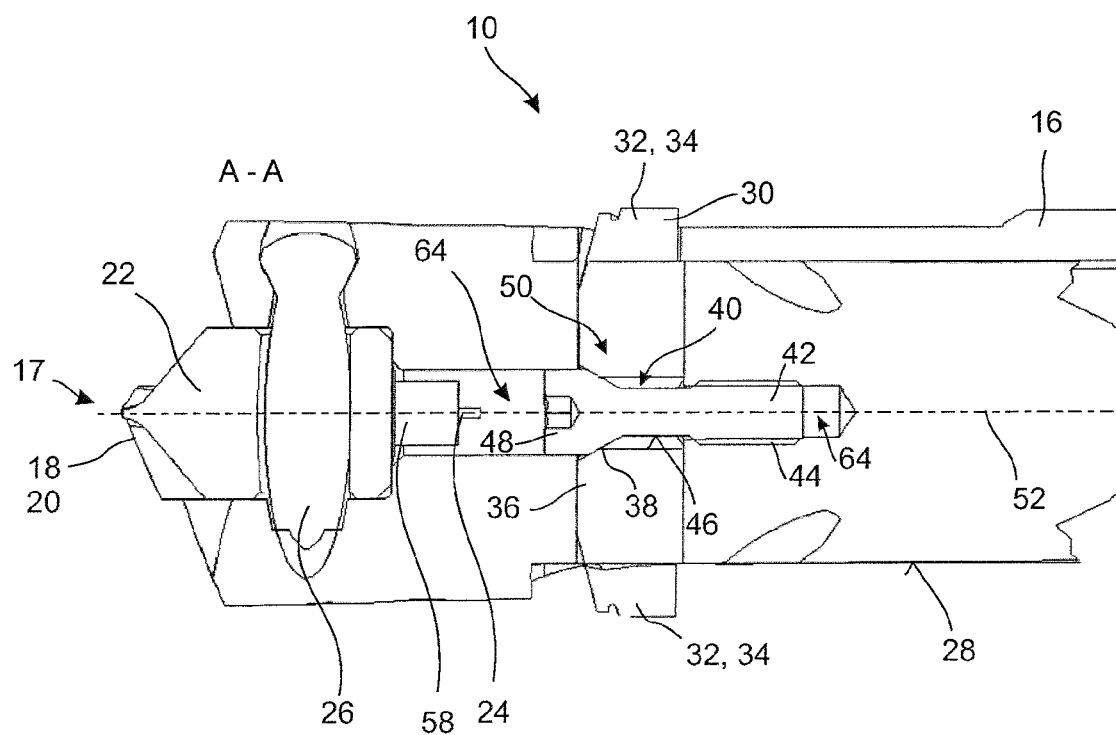
FIG. 7 shows a further longitudinal section through a section of a tool head according to FIG. 4.

FIG. 2 shows a plan view of the tool head 16 and the first cutting insert 22. In this view two outlet outputs of coolant lines 66 of the tool main body 60 can be seen. In the plan view the first two cutting regions 18 with the first cutting edges 20 of the first cutting insert 22 can be identified as well as the tool head surface 28 of the tool head 16. FIGS. 6 and 7 show the relevant sectional views A-A and B-B.

Figure 3:
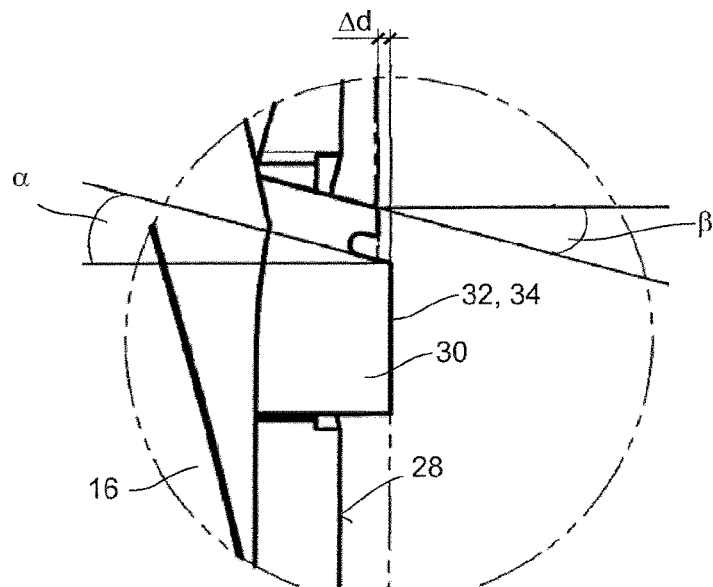
FIG. 3 shows a section from FIG. 1.

FIG. 3 shows a detailed view of a second cutting region 32 from FIG. 1. The second cutting edge 34 projects beyond the radius of the first cutting edge 20 by a distance Δd so that the second cutting edge 34 can remove further material and accordingly recuts to some extent and reworks the surface of a bore. A reworking of a surface of a bore is preferably possible with such a second cutting insert with a second cutting edge 34 in the form of a reaming blade. The angles α and β are preferably 10° to 20°, in particular 15°. The projection Δd is preferably 0.3 mm to 0.6 mm, in particular 0.5 mm.

Figure 4:
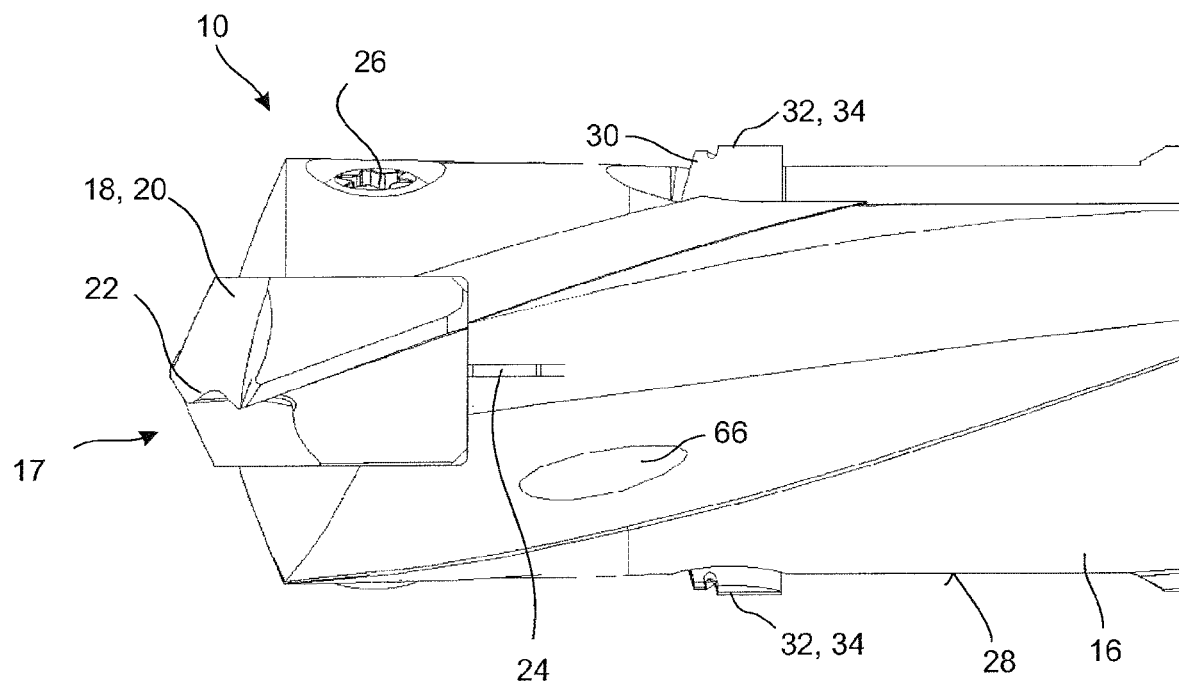
FIG. 4 shows a section of a tool head of one embodiment of a rotary tool according to the invention in a side view.

FIG. 4 shows a section of a tool head 16 of one embodiment of a rotary tool 10 according to the invention in a perspective side view. The side view shows a first cutting insert 22, wherein only a first cutting region 18 is visible in this diagram. The first cutting insert 22 is mounted from the front side 17 on the tool head 16, by inserting this into an insert groove 58 (not visible) and fixing on the tool head by means of a radially introduced screw 26 which engages in the flanks of the tool head forming the insert groove 58. Located below the insert groove 58 is a strain-relief slot 24 which makes it easier to install and dismount the first cutting insert 22 in the insert groove 58 and enables a minimal widening of the insert groove 58 so that this can have a clamping effect on the first cutting insert. The second cutting insert 30 with two second cutting regions 32 is arranged in a rearward offset position in the axial direction of the tool head 16. This is inserted with its insert main body 36 into a radial through-hole (not visible) of the tool head 16 so that the two second cutting regions 32 project slightly beyond the diameter of the tool head 16, wherein this projection is preferably identical. Furthermore, an outlet opening of a coolant line 66 is shown.

Figure 5:
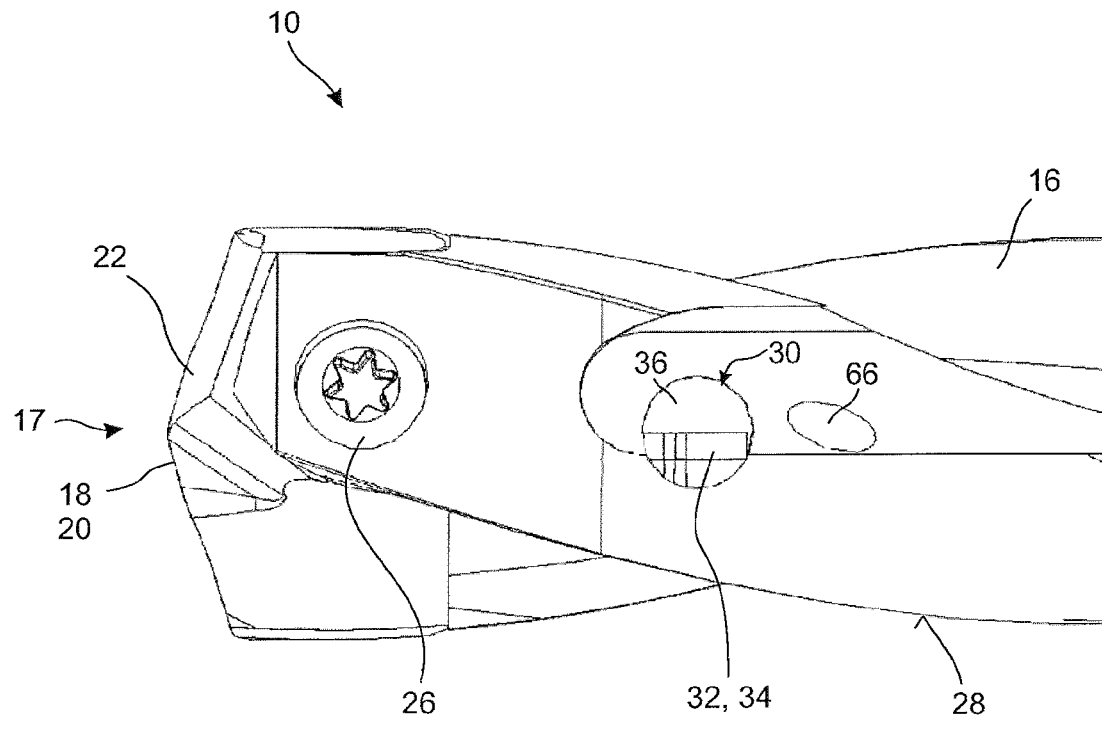
FIG. 5 shows a further side view of the embodiment from FIG. 4.

FIG. 5 shows a side view of the embodiment from FIG. 4 from a position turned through 90°. In this view the second cutting insert 30 is visible in a plan view of a second cutting region 32. The insert main body 36 has a circular cross-section, wherein the second cutting region 32 with the second cutting edges 34 has a partially circular cross-section and so to speak forms a partial extension of the insert main body 36. The screw 26 is not visible in a complete plan view of the screw head. This shows that the screw must not lie in a plane with the insert main body 36 of the second cutting insert 30.

FIGS. 6 and 7 show two sectional views wherein the position of the sections A-A and B-B can be deduced from FIG. 2.

FIG. 6 shows a longitudinal section through a section of a tool head 16. The sectional plane B-B runs centrally through the insert main body 36 of the second cutting insert 30 so that the fastening means 42 which fastens the second cutting insert 30 can also be seen in section. The second cutting insert 30 possesses centrally a through-hole 40 through which a fastening means 42, for example a fastening screw or a locking bolt, can be pushed. In this embodiment the fastening means 42 in the form of a socket head screw with conical screw head has a front section with a thread 44 as well as a rear section with a smooth surface 46. With the thread 44 the fastening means 42 is screwed into a blind hole 64 of the tool main body which is located on the axis of rotation. In the screwed-in state the section with the smooth surface 46 is located at least partially inside the through hole 40. On one side of the through hole 40 a conical recess 38 is located in the insert main body 38 in which the head 48 of the fastening means 42 can be recessed at least partially in order to ensure a positional fixing. Thus, the second cutting insert 30 is fastened centred on the axis of rotation 52 of the rotary tool 10. The head 48 of the fastening means 42 is located in a radially extended section of the blind hole 64, wherein the fastening means 42 is mounted from the front side 17 of the tool head 16 in the insert groove 58. In the direction of the front side 17, the blind hole 64 is cut by the insert groove 58, wherein the blind hole 64 has the strain-relief slot 24 in this region. The first cutting insert 22 is pushed or inserted into the insert groove 58 from the front side 17. The sectional view also shows a section through the screw 26 which is used for fastening the first cutting insert 22.

FIG. 7 shows the section A-A which runs turned through 90° to the section B-B. The section runs along through the insert main body 36 of the second cutting insert 30. In this sectional view the strain relief slot 24 as well as the insert groove 58 can be seen particularly clearly. The screw 26 does not run directly in the sectional plane but at an angle thereto so that this appears arched in the sectional view.

Figure 8:
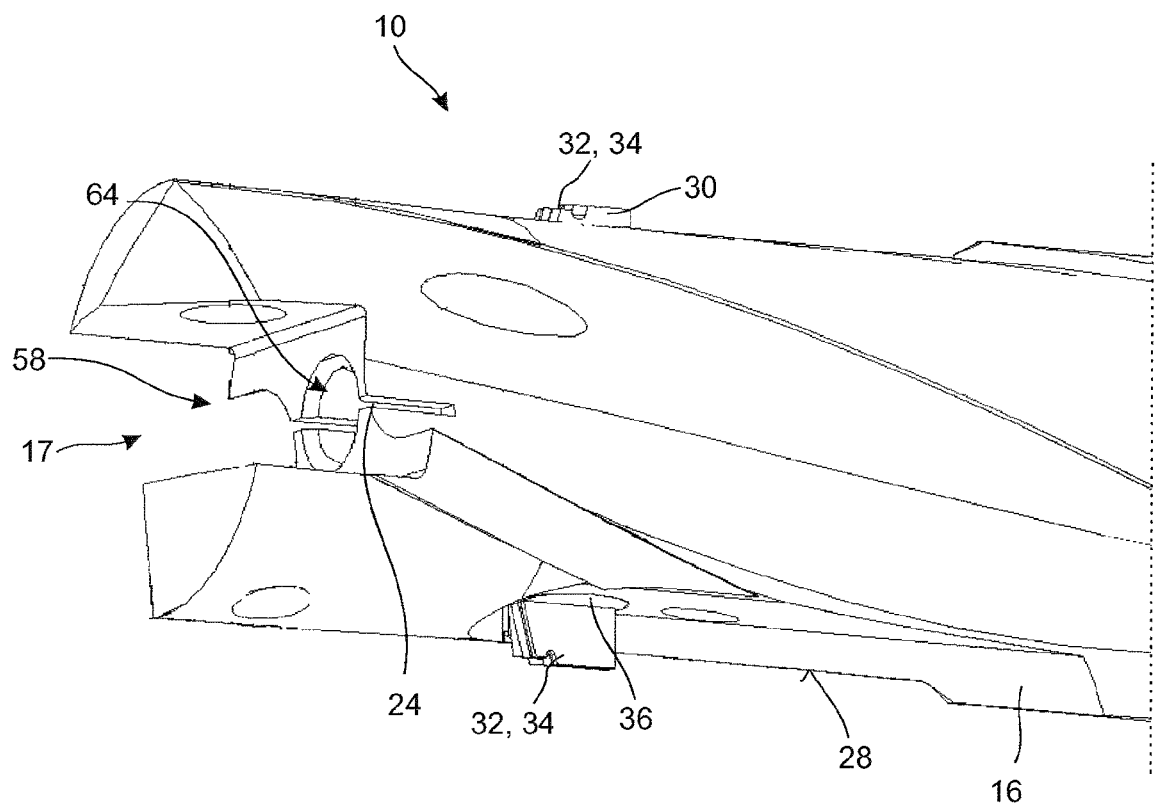
FIG. 8 shows a section of a tool head of an embodiment of a rotary tool according to the invention without a first cutting insert.
Figure 9:
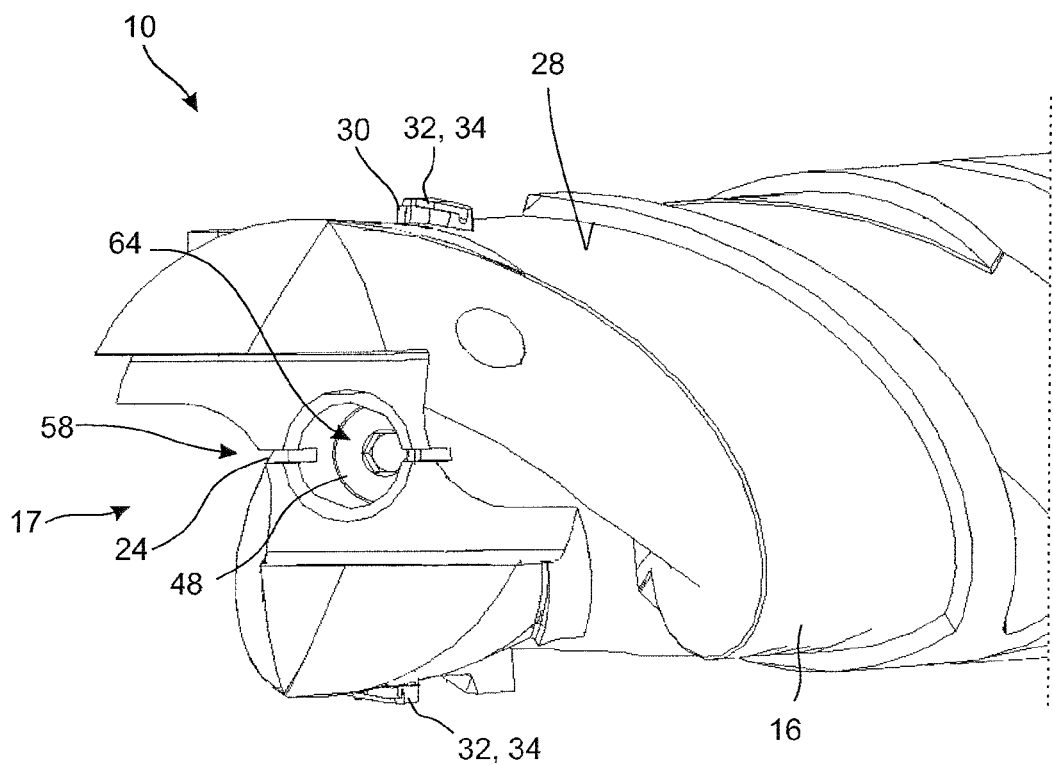
FIG. 9 shows a section of a tool head of an embodiment of a rotary tool according to the invention without a first cutting insert.

FIGS. 8 and 9 show two three-dimensional views of the tool head 16 without the first cutting insert 22, so that the geometry of the insert groove 58 and the transition between the insert groove 58 and the blind hole 64 with the strain relief slot 24 can be identified. The second cutting insert 30 is mounted in the tool head 16. The head 48 of the fastening means 42 can be identified in FIG. 9 in the blind hole 64. The fastening means 42 can be introduced from the position shown in FIG. 9 in order to fix the second cutting insert 30. The insert groove 58 runs over the complete width of the tool head 16, the blind hole 64 is located centred on the axis of rotation of the rotary tool 10.

Figure 10:
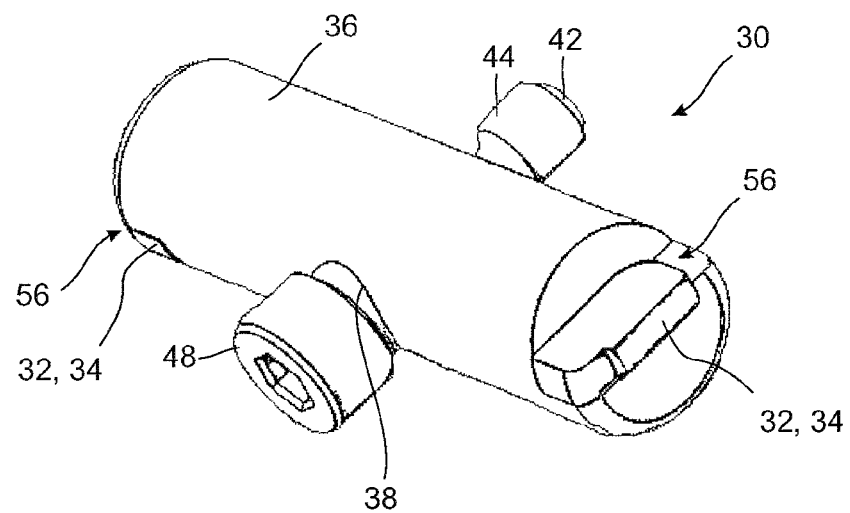
FIG. 10 shows an embodiment of an exchangeable tool head according to the invention with screw.

FIG. 10 shows an embodiment of a second cutting insert 39 with fastening means 42. The insert main body has a circular cross-section, wherein in the end regions 56 this cross-section goes over into a partially circular cross-section in order to form the cutting region 32. In this region respectively one cutting region 32 with respectively one second cutting edge 34 is attached, e.g. soldered on, welded on or screwed on. The fastening means 42 is a screw type, wherein the head 48 in this embodiment cannot be recessed in the through hole 40. The shaft of the screw has a section with a thread 44 which can be screwed into a tool head 16. The remaining shaft of the screw has a smooth surface and can have a tapering cross-section in this embodiment (not visible). Thus, the screw can be centred in the through hole 40 by screwing into a conical recess 38.

Figure 11:
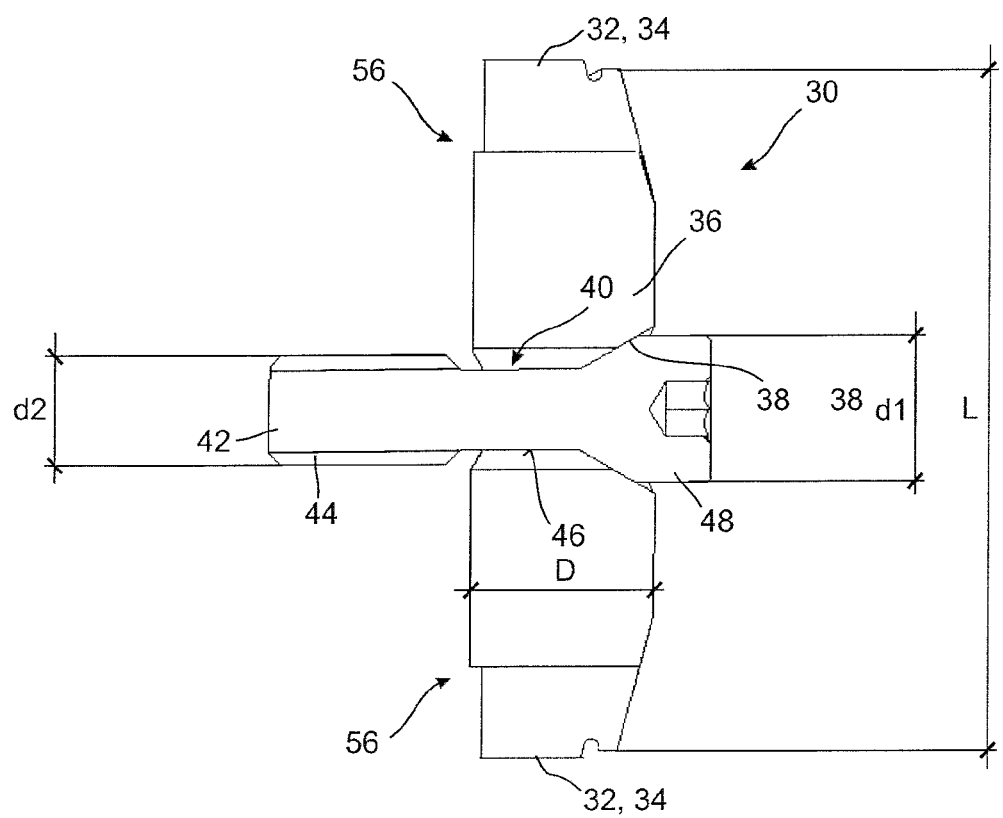
FIG. 11 shows a sectional view of an exchangeable second cutting insert with screw according to the invention.

A sectional view of a further embodiment of a second cutting insert 30 is shown in FIG. 11. The insert main body 36 has a varied cross-section D over the length L, wherein the cross-section decreases towards the end regions 56. Respectively one second cutting region 32 with a second cutting edge 34 is located on the end regions 56. The through hole 40 is arranged centrally in the insert body 36 and dimensioned so that the fastening means 42, here a screw, can still be pushed through the through hole 40. The head 48 of the screw has a larger diameter d1 than the through hole 40 with a minimum diameter d2. Due to the conical recess 38 the screw can fix and centre the second cutting insert 30.

Figure 12:
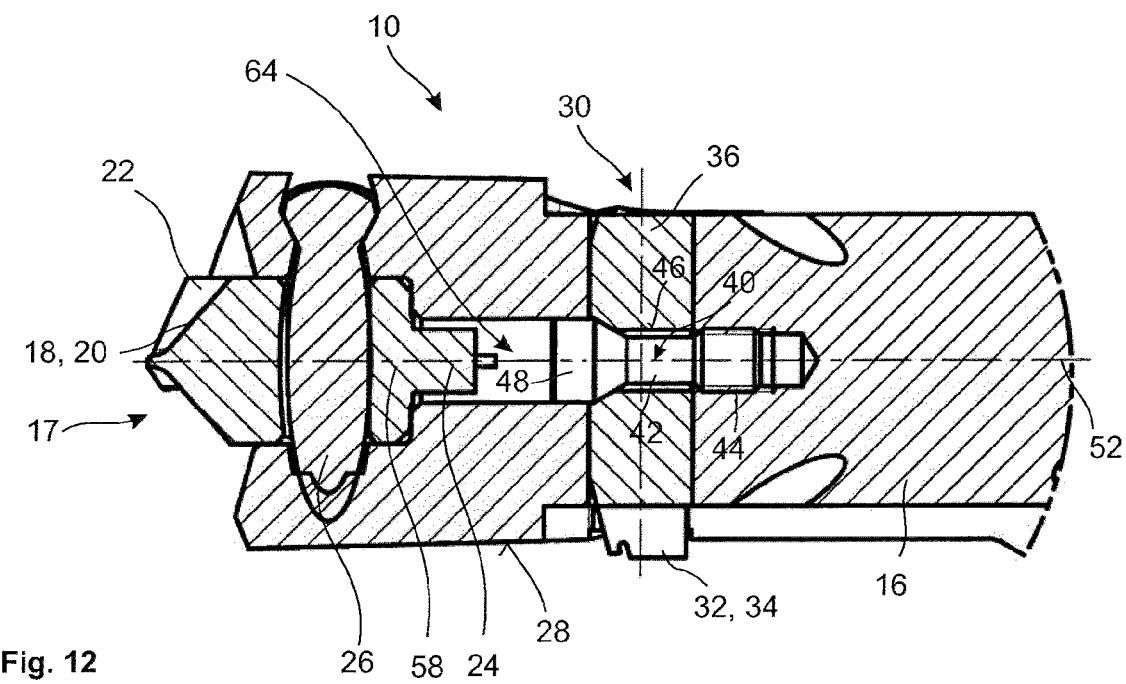
FIG. 12 shows a sectional view of a section of a tool head of an embodiment of a rotary tool according to the invention through the longitudinal axis of the insert main body of the second cutting insert.
Figure 13:
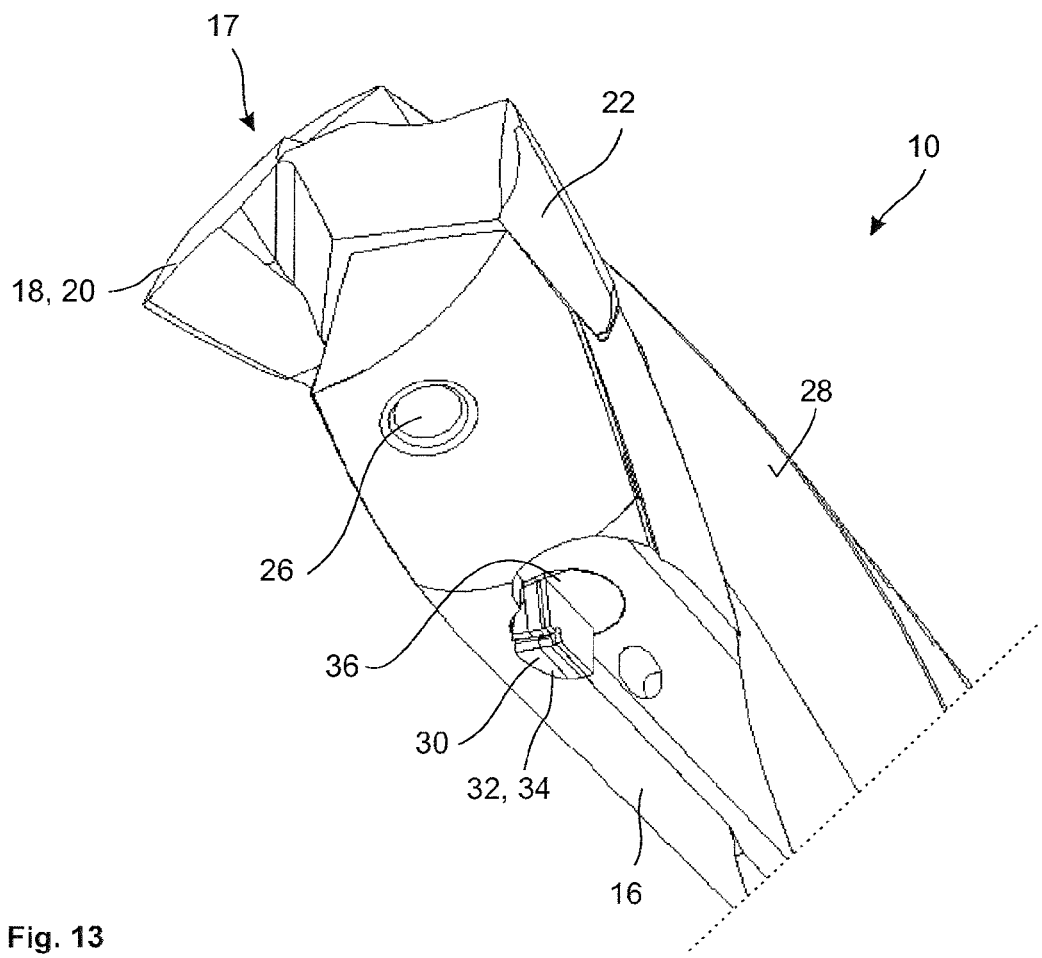
FIG. 13 shows a section of a tool head of an embodiment of a rotary tool according to the invention with a first cutting insert.

FIG. 12 shows a further sectional view of a tool head 16. Here it is particularly clear that an intermediate space in the blind hole 64 remains between the head 48 of the fastening means 42 and the first cutting insert 22 in the installed state of both cutting inserts 22, 30. FIG. 13 shows a three-dimensional view of the embodiment from FIG. 12. Alternatively there is the possibility of dispensing with the fastening means 42 and using a bolt of the first cutting insert which projects into the blind hole 64 for centring and positionally fixing the second cutting insert 30.

Figure 14:
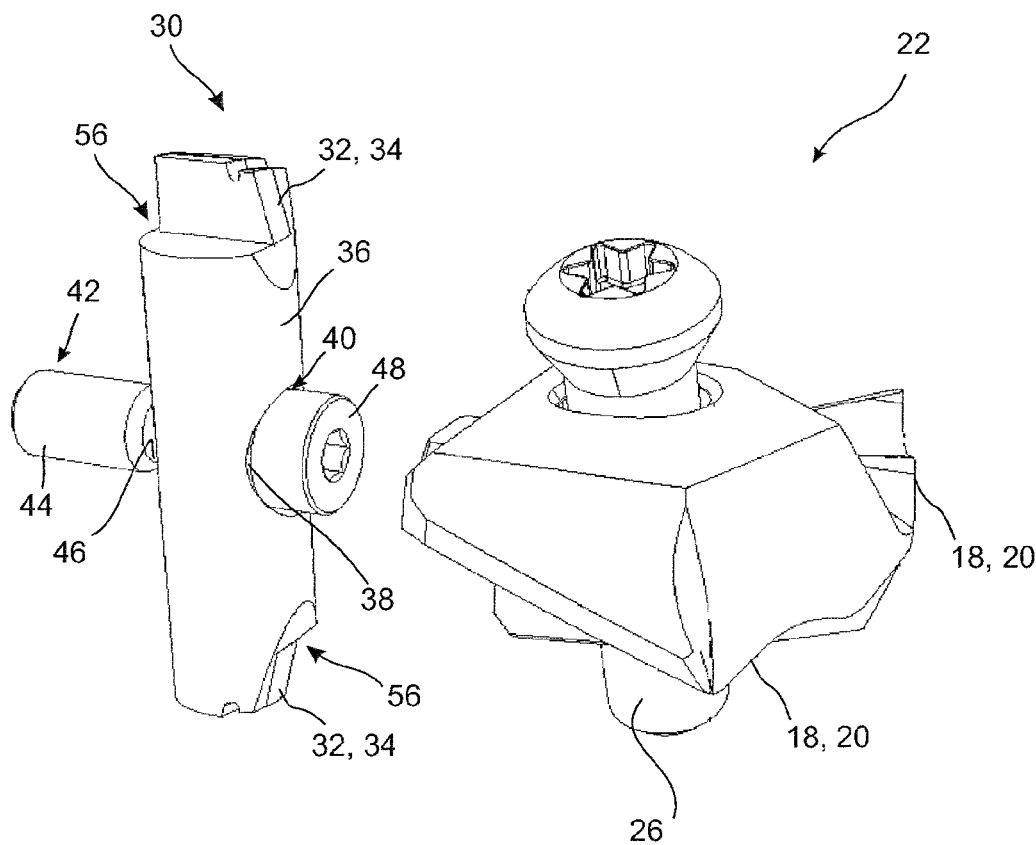
FIG. 14 shows an embodiment of a cutting insert set.

FIG. 14 shows an embodiment of a cutting insert set consisting of a first cutting insert 22, a second cutting insert 30, a fastening means 42 for fastening the second cutting insert 30 and a screw 26 for fastening the first cutting insert on a tool main body 60. In this embodiment, the first cutting insert 22 has two first cutting regions 18 with respectively one first cutting edge 20. The first cutting insert is fastened by means of a screw 26 in an insert groove 58 on the tool head 16. The second cutting insert 30 consists of an insert main body 36 which has a cylindrical cross-section which tapers towards the end regions 56 and goes over into a partially circular cross-section. A second cutting region 32 with a second cutting edge 34 is attached in each end region 56. Located centrally in the second cutting insert 30 is a through hole 40 for passing through a fastening means 42 such as a screw or a bolt. The through hole 40 has a conical recess 38 at one end. When mounting the second cutting insert 30 in a tool head 16, this conical recess 38 is used for centring the second cutting insert 30 on the axis of rotation of the rotary tool 10. The fastening means 42 has a head 48, a section with a smooth surface 46 and a section with a thread 44. With the thread 44 the fastening means 42 can be screwed into a tool head or a tool shaft. The screw insert set can be provided as a replacement part in cases of wear and inserted in a tool main body 60. Thus, the replacement costs for wear-induced abrasion of the blades are drastically reduced and a tool main body 60 with coolant channels 66 and cutting guide channels can be used with an extremely long lifetime.

Figure 15:
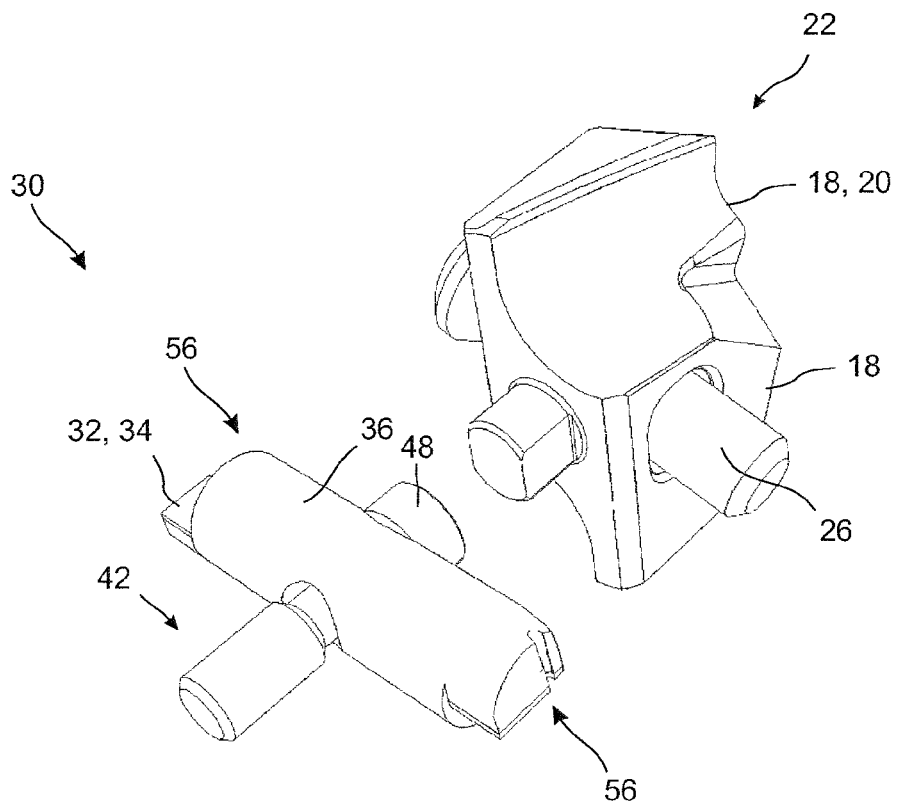
FIG. 15 shows a further embodiment of a cutting insert set.

FIG. 15 shows a further view of the cutting insert set shown in FIG. 14. The first cutting insert set 22 has a pin on the underside which can engage in a blind hole 64 of the tool head 60 in order to be able to fasten the first cutting insert 22 additionally in a radially fixed manner.

REFERENCE LIST

10 Rotary tool
14 Clamping section
16 Tool head
17 Front side
18 First cutting region
20 First cutting edge
22 First cutting insert
24 Strain relief slot
26 Screw for cutting insert
28 Tool head surface
30 Second cutting insert
32 Second cutting region
34 Second cutting edge
36 Insert main body
38 Conical recess
40 Through hole for fastening means
42 Fastening means
44 Thread
46 Smooth surface
48 Head of fastening means
50 Through hole for reaming blade
52 Axis of rotation
54 Surface of bore
56 End region of main body
58 Insert groove
60 Tool main body
64 Blind hole
66 Coolant channel
D Diameter of insert main body
L Length of insert main body
Δd Projection of second cutting edge with respect to first cutting edge

The invention claimed is:

1. A rotary tool for a machining of workpieces comprising a tool main body comprising:
    a clamping section;
    a tool head;
    an exchangeable first cutting insert having at least one first cutting region having a first cutting edge, wherein the first cutting insert is capable of being inserted from a front side of the tool head into an insert groove of the tool main body and is capable of being fastened therein in a rotationally fixed manner;
    an exchangeable second cutting insert as a reaming blade insert, the second cutting insert is positioned in a radial through hole that extends through the tool head, the second cutting insert is fastened on the tool head in a position that is axially offset, with respect to the first cutting insert, toward the clamping section, the second cutting insert comprising a main body of the second cutting insert, and at least one second cutting region having a second cutting edge, the second cutting insert is capable of being fixed in a centered position with respect to a rotational axis of the tool head in a cross-section perpendicular to the rotational axis of the tool head; and
    a fastening means for the second cutting insert, the fastening means being arranged in the insert groove, the fastening means being accessible from the front side of the tool head, the fastening means is longer than a dimension of the main body of the second cutting insert in an axial direction of the rotary tool with the second cutting insert inserted in the radial through hole that extends through the tool head, wherein the fastening means extends through the main body of the second cutting insert and has a thread for screwing to the tool main body in at least one region outside the main body of the second cutting insert.

2. The rotary tool according to claim 1, wherein a length of the main body of the second cutting insert is less than or equal to a diameter of the tool head, and the second cutting region projects beyond a radius of the first cutting region by a radial distance.

3. The rotary tool according to claim 1, wherein the main body of the second cutting insert has a circular, partially circular, rectangular or elliptical cross-section.

4. The rotary tool according to claim 1, wherein the second cutting insert is configured to be point-symmetrical in relation to a point on a cross-sectional surface at half the length of the second cutting insert.

5. The rotary tool according to claim 1, wherein the main body of the second cutting insert and the second cutting region are formed from separate components, wherein the second cutting region with the second cutting edge is soldered, welded or screwed onto the main body of the second cutting insert.

6. The rotary tool according to claim 1, wherein the second cutting insert has a conical recess in which a head of the fastening means is capable of being inserted at least partially.

7. The rotary tool according to claim 1, wherein the insert groove has a blind hole that extends toward the clamping section, and the blind hole has at least two sections with different diameters, wherein at least one of the at least two sections has a thread.

8. The rotary tool according to claim 1, wherein the main body of the second cutting insert is cylindrical.

* * * * *